UNITED STATES PATENT OFFICE.

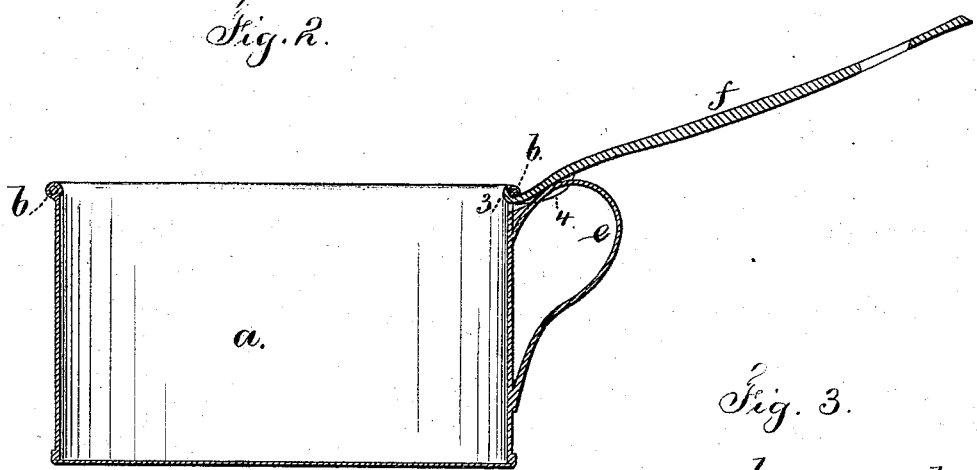
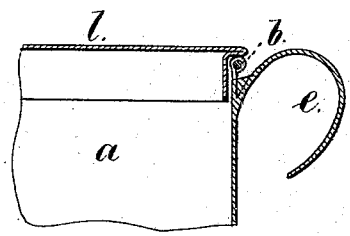
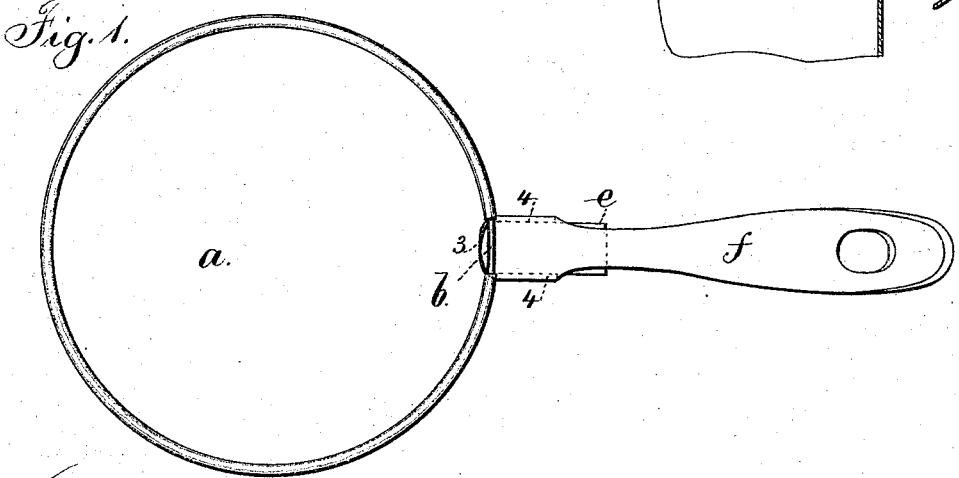

JAMES H. PREATER, OF BROOKLYN, NEW YORK, ASSIGNOR TO HIMSELF AND GEORGE S. ADAMS, OF NEW YORK CITY.

IMPROVEMENT IN DETACHABLE HANDLES FOR SAUCEPANS.

Specification forming part of Letters Patent No. 152,866, dated July 7, 1874; application filed June 9, 1874.

*To all whom it may concern:*

Be it known that I, JAMES H. PREATER, of Brooklyn, in the county of Kings and State of New York, have invented an Improvement in Saucepans, of which the following is a specification:

Workmen very generally use dinner-cans, with a cup connected therewith, and such cups are provided with short bow-handles at one side. With this class of people one utensil frequently has to be used for several purposes. My invention relates to a removable handle of peculiar construction applied to such cups, whereby the same is converted into a saucepan.

I make an opening beneath the rim-wire of the cup, between that and the sheet-metal bow-handle, and I provide a movable handle, with a lip at the end, to be passed beneath such rim-wire, and with side wings that pass at the sides of the fixed bow-handle. Thereby the removable handle adapts the cup to use as a saucepan.

In the drawings, Figure 1 is a plan of the saucepan with the movable handle in place. Fig. 2 is a section of the same; and Fig. 3 is a section of the cup at the stationary handle.

The cup $a$ is made with the rim-wire $b$, as usual, except that the sheet metal is removed at one side to leave a narrow opening beneath the rim-wire, and beneath this opening the fixed bow-handle $e$ is firmly secured to the side of the cup. The movable handle $f$ is made with a lip, 3, at the end that is hooked beneath the wire around the cup, and the back of this handle $f$ rests upon the top of the fixed handle $e$.

The side wings 4 4 of this handle $f$, extending down at the sides of the handle $e$, prevent lateral movement of the handle $f$, so that when the handle is hooked into place it answers all the purposes of a permanent saucepan-handle; and, when the said handle $f$ is unhooked and removed, the cup $a$ can be used for its ordinary purposes.

The removable cover $l$ can be employed either with the cup or with the saucepan.

The handle $f$ may be, as a spoon, provided at its end with the lip 3, in which case the handle will not be liable to be mislaid.

I claim as my invention—

The removable handle $f$, with the lip 3 and wings 4, combined with the cup $a$, having an opening for the end of such handle between the stationary handle $e$ and rim-wire $b$, as and for the purposes set forth.

Signed by me this 5th day of June, A. D. 1874.

JAMES H. PREATER.

Witnesses:
GEO. T. PINCKNEY,
CHAS. H. SMITH.